July 30, 1963 J. E. WHITE ETAL 3,099,814
SEISMIC RECORDING TO EMPHASIZE SELECTED CHARACTER
Filed Oct. 22, 1954 2 Sheets-Sheet 1

JAMES E. WHITE
PHILIP L. LAWRENCE
INVENTORS

BY D. Carl Richards
ATTORNEY

United States Patent Office 3,099,814
Patented July 30, 1963

3,099,814
SEISMIC RECORDING TO EMPHASIZE
SELECTED CHARACTER
James E. White and Philip L. Lawrence, Dallas, Tex.,
assignors, by mesne assignments, to Socony-Vacuum
Oil Company, Incorporated, New York, N.Y., a corporation of New York
Filed Oct. 22, 1954, Ser. No. 464,018
16 Claims. (Cl. 340—15.5)

This invention relates to seismic exploration and more particularly to recording selected motional character such as zero incidences of oscillatory seismic signals in such a manner as to facilitate interpretation of seismic records.

Seismograms conventionally are produced by recording as individual traces the excursions of a spot of light reflected from a galvanometer mirror. Collectively such traces or undulating lines indicate the existence of reflecting subsurface beds by timed coincidence of distinctive character in each trace. A seismogram of 12 or 24 traces or more may represent coverage along the earth's surface along a given traverse of 1,000 feet more or less. In order to gain a perspective of the geologic section underlying traverse lines, it is necessary to study a great number of such records and correlate them or compare them one with another. This becomes a taxing process when using conventional seismograms.

The present invention provides for recording seismic data in a new and distinctive manner. More particularly in accordance with the present invention, electrical signals corresponding with earth movement at a plurality of receiving stations along the earth's surface are translated into a physical oscillation and the time spacing of zero incidences in the oscillations of all such electrical voltages are recorded. In one aspect of the invention, all electrical signals from a given seismic spread and translated into light vibrations are focused upon the same mean point. By suitably stopping the light path, only the zero incidences of oscillation are recorded to produce a record of superimposed zero crossings which accurately reflects the seismic character detected at the earth's surface. In another aspect of the invention, zero incidences are recorded side by side on a recording medium to permit concentration of seismic data in a limited space as to permit ready comparison of great numbers of such records.

Figure 3:
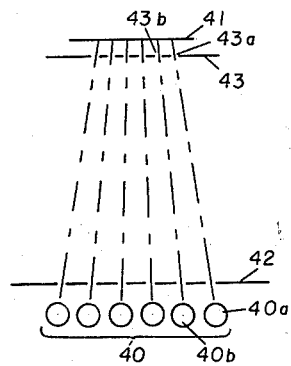
Figure 1:
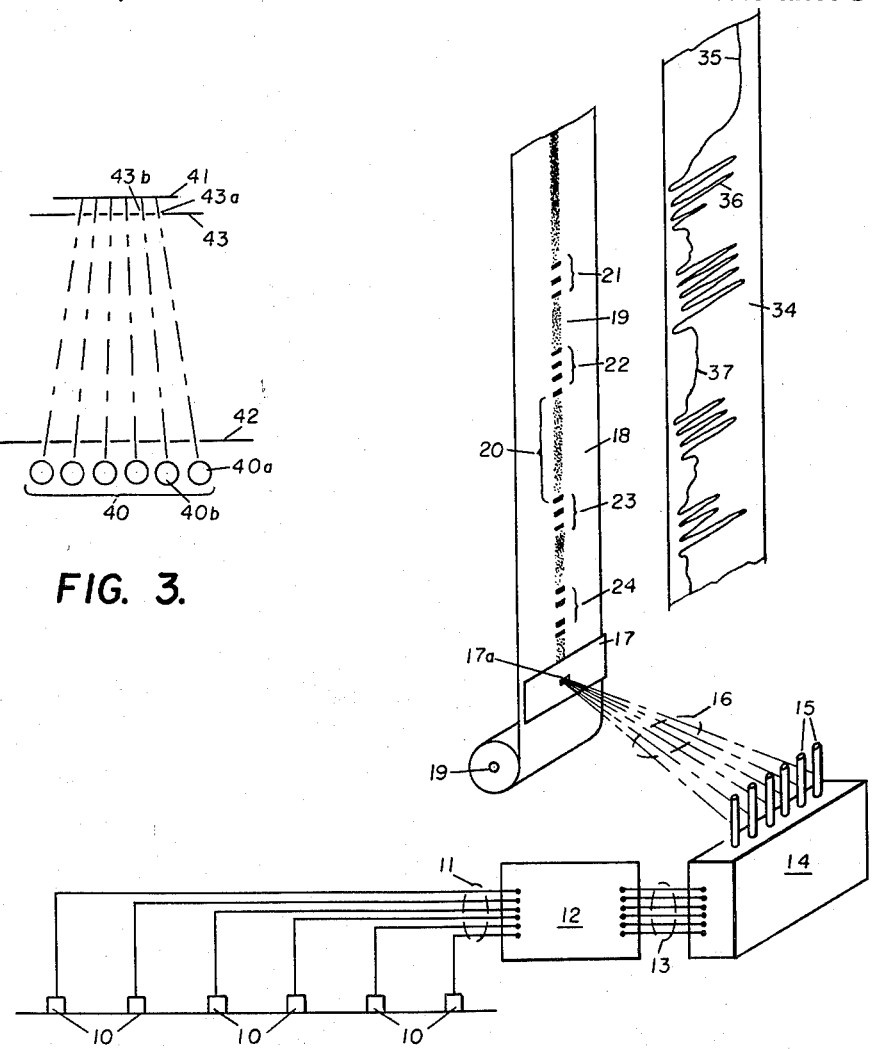
Figure 2:
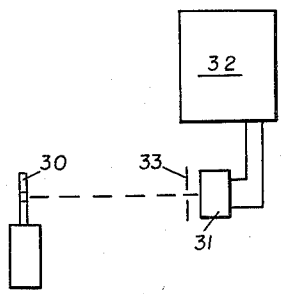
Figure 4:
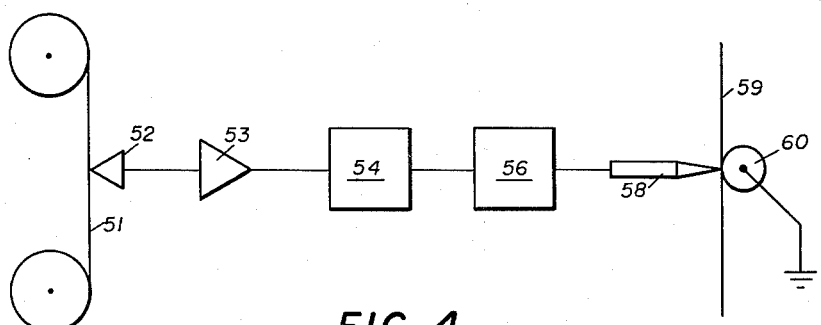
Figure 5:
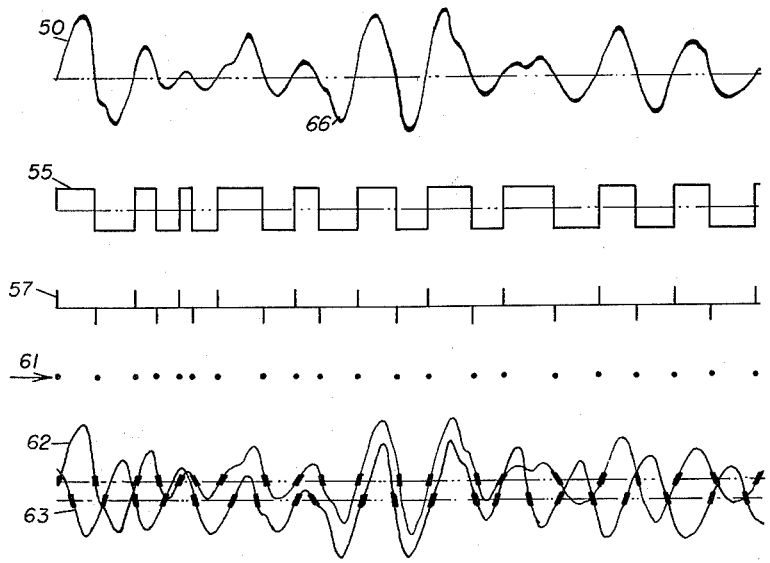

For a more complete understanding of the invention, reference may now be had to the following description taken in conjunction with the accompanying drawings in which:

FIG. 1 illustrates a seismic exploring system embodying the present invention;
FIG. 2 illustrates a modification of FIG. 1;
FIG. 3 is a further modification of the invention;
FIG. 4 is a modification of the system of FIG. 1; and
FIG. 5 is a time plot of voltage functions employed in the system of FIG. 4.

In FIG. 1 a plurality of detectors 10 positioned on the earth's surface is connected by cable means 11 to a multichannel amplifier 12 whose outputs are connected by cable 13 to a galvanometer bank 14. Light from a source (not shown) directed onto the mirrors of galvanometers 15 is reflected along paths 16 onto a light stop 17. A recording strip 18 from a supply roll 19 is driven past stop 17 by suitable means, not shown but well understood by those skilled in the art. As a result, a single trace is produced on chart 18. In operation, galvanometers 15 are initially adjusted to position light reflected therefrom at the center of the aperture 17a on stop 17. Thus positioned, there will be produced a quiescent line on record 18. However, upon detonation of an explosive charge to produce seismic waves, signals generated by seismometers 10 actuate galvanometers 15 individually in dependence upon the earth motion at the plant of each of the seismometers 10. The signal amplification in amplifier bank 12 is adjusted so that the excursions of the galvanometer spots are of relatively large amplitude. Preferably the excursions are maintained large compared to the dimensions of the aperture 17a. Thus, as recording medium 18 is driven past aperture 17a, the zero crossings or excursions of beams 16 from galvanometers 17 are recorded as short segments, i.e., either spots or short lines normal to the direction of movement of the recording medium 18.

If random noise energy is present, the trace 19 will be characterized by relatively light, fairly uniform shading such as shown in the record section 20. However, when the earth motion at all of the detectors is uniform or in phase, such as upon the arrival at the earth's surface of energy reflected from a subsurface bed, all of the galvanometer spots will traverse the aperture 17a at the same time, thus producing on trace 19 relatively dark bands separated by clear bands as, for example, characterize the sections 21, 22, 23 and 24. The time coincidence of zero crossings or zero incidences of seismic signals thus recorded may indicate to an observer or an interpreter the portions of the record 18 characterized by reflected energy and conversely indicate the portion of record 18 characterized by random energy.

The entire seismogram may constitute a single trace which may then be utilized by an interpreter, as, for example, combined with a plurality of similar seismograms taken in the same area to graphically portray an accurate representation of an earth section along a selected traverse. It will be readily apparent that the record may occupy a space of but a portion of an inch laterally so that a great number of records may be placed within view to indicate regional character in the lithology.

In FIG. 2 there is illustrated an alternative system for producing the above-described record. In this system beams of light from galvanometers such as galvanometer 30 are focused onto a photo cell 31 whose output is applied to a recorder 32 which may be a galvanometer type system or may be adapted to record the output of cell 31 in reproducible form as, for example, on magnetic tape. A suitable stop 33 is provided in the path of light from galvanometer 30 so that light impinges cell 31 only upon the occurrence of zero crossing of the deflection of the galvanometer. Thus the output of cell 31 will produce a line record which is the equivalent trace 19 on record 18. For the purpose of comparison, one such line record 34 has been shown in FIG. 1.

It will be seen that simultaneous zero crossings of all the beams 16 correspond to high amplitude deflection of trace 35 such as in zone 36, whereas random zero crossings of beam 16 correspond with a relatively low uniform background level such as in the zone 37 of trace 35.

In FIG. 3 a representation of a further modification has been shown and comprises a bank of galvanometers 40 for recording undulating signals on a recording medium 41. A mask 42 is placed immediately adjacent galvanometers 40. A second mask 43 is placed adjacent recording medium 41. The mask 43 is designed to permit light to pass onto recording medium 41 at selected spaced apart points. Preferably the spacings between the points will be approximately equal to the width of the points. The second mask 42 is so designed as to prevent light from galvanometer 40a from passing onto recording medium 41 through any aperture in mask 43 except the first aperture 43a, thus preventing confusion of the data on record 41. Similarly, light from galvanometer 40b can reach the recording medium only by way of slot 43b, etc. This system then may provide a record similar to that upon recording medium 18, FIG. 1, except the traces are laterally displaced as in six closely spaced parallel columns and are thus separately recorded. The time coincidence of zero crossings will be graphically emphasized on the recording medium 41 and will facilitate inspection and procedures of analysis of the same character above described in connection wtih record 18.

It will now be appreciated that the present invention is particularly useful in the analysis of seismograms recorded in phonographically reproducible form such as illustrated and described in United States Patent No. 2,144,812 to Rieber. Signals produced upon playback of a phonographically reproducible record may then be applied to a permanent recording medium to form a single trace compositing all of the zero crossings of a plurality of signals on the phonographically reproducible record in the manner shown in FIG. 1.

If desired, the signals from the phonographically reproducible record may be recorded separately in the manner shown in FIG. 3 to graphically portray the time relation of zero incidences of the plurality of signals.

Another system for graphically recording the time occurrence of zero incidences in seismic signals is illustrated in FIGS. 4 and 5. A seismic signal of the form shown on trace 50, FIG. 5, recorded on a magnetic tape 51, FIG. 4, is detected by pickup 52 and applied to an amplifier 53. Following amplification a clipping network 54 alters the wave shape of trace 50 to that shown in trace 55. The output of clipping network 54 is then applied to a differentiator 56 whose output may be represented by the waveform 57. The latter voltage is suitably applied to an electrode 58 of a spark discharge recording system in which an electro-sensitive paper 59 is driven over a grounded conductive roller 60 and thus records the existence of electrical arcs between electrode 58 and roller 60. Such arcs are produced in response to each spike in waveform 57. Thus the points along trace 50 representative of zero amplitude are represented by the time spaced dots such as shown along line 61.

Similarly, to record a plurality of seismic signals a like number of channels such as shown in FIG. 4 would be provided with outputs of all channels applied to electrode 58 to form a composite trace of all signals. Alternatively, a plurality of electrodes, one for each channel, may be provided and positioned with their points spaced laterally across the sensitized paper 59 separately to record the times of zero signal. This modification of the invention may be found suitable for producing compact seismic recordings which, though limited as to the detail in which earth motion is depicted, present essential time data for determination of variations in subsurface lithology.

Having described the invention in connection with the modifications shown in FIGS. 1–4, it will now be seen that seismograms are so recorded as to emphasize the zero incidence portions of alternating voltages. This permits the recording of a number of seismic signals utilizing a minimum of space. The records of the type shown by trace 61, FIG. 5, may be consolidated so that extended seismic traverses in a given region may be so foreshortened as to present regional seismic prominences and trends clearly to the view of an observer.

If desired, recordings may be made within the provisions of this invention which include more information than that shown on trace 61 of FIG. 5. For example, if masks 42 and 43 are made of material which attenuates but permits some passage of light (in contrast to completely opaque material above-described), then a plurality of traces may be recorded in closely adjacent side-by-side relationship and the zero incidences will be highly accentuated as the light passes through ports or slots in both masks 42 and 43. However, in the portions where the light from any of the galvonometers 40 passes through the attenuating portions of masks 42 and 43 a fine trace of greatly reduced intensity will be recorded, thus retaining all of the detail of the seismic signal. Traces 62 and 63, FIG. 5, show the latter type of recording. The entire trace is retained as to form a light background for the intense or dark time segments of each trace where the traces cross their zero axis. By proper selection of the dimensions of the slots in mask 43, the slope of the signal adjacent the zero incidences, as well as the time of zero crossings, may be emphasized. Regional characteristics may readily be seen. For detailed study the finer portions of the recording may be utilized to verify and further delineate the structural problems.

Traditionally, seismic computations have been based upon the coincidence in time of oscillation peaks or troughs such as the trough 66, FIG. 5, of seismic velocity functions. While the foregoing discussion has related to the recording of zero axis crossings, it will be apparent that the indications of such peaks or troughs may be recorded in the manner herein described merely by differentiating a signal such as on trace 50 and recording the zero crossing. In such case, the instants of zero acceleration would be recorded. Through integration zero incidences of displacement may be recorded.

This and other modifications may now suggest themselves to those skilled in the art and it is intended to cover such modifications as fall within the scope of the appended claims.

What is claimed is:

1. In seismic exploration where detonation of an explosive charge produces motion of the earth at seismic detecting stations spaced from the point of detonation the method which comprises producing alternating electrical voltages which vary in accordance with said motion at said detecting stations, and recording on a time related scale visual indications of said voltages in correlation with the instant of said detonation and characterized by highly emphasizing zero incidence portions of said voltages relative to other portions thereof.

2. In seismic exploration where detonation of an explosive charge produces motion of the earth at seismic detecting stations spaced from the point of detonation the method which comprises producing alternating electrical voltages which vary in accordance with said motion at said detecting stations, translating each of said voltages into a physical effect having an undulating character relative to a mean value, and selectively recording on a time related scale visual indications which highly emphasize the limited portions of said effects in the region of said mean value relative to other portions thereof in correlation with the instant of said detonation.

3. In seismic exploration where detonation of an explosive charge produces motion of the earth at seismic detecting stations spaced from the point of detonation the method which comprises producing alternating electrical voltages which vary in accordance with said motion at said detecting stations, translating said voltages into undulating light beams such that at a recording point the undulations of all said beams are confined substantially to a common line, and selectively recording on a time related scale visual indications of a limited fraction of said undulations including the mean thereof.

4. In seismic exploration where detonation of an explosive charge produces motion of the earth at seismic detecting stations spaced from the point of detonation the method which comprises producing alternating electrical voltages which vary in accordance with said motion at said detecting stations, translating said voltages into undulating light beams such that at a recording point the undulations thereof are confined substantially to a common line, moving a recording medium past said recording point in a direction normal to the direction of said line, and optically limiting the trajectory of said beams to record a limited fraction of said undulations including the mean thereof.

5. The method of claim 4 in which said undulations have a common mean point for superimposing in a single trace the zero incidences of all of said beams.

6. In the seismic recording of voltages representative of or dependent upon the motion of the earth at a seismic detecting station following detonation of an explosive charge the combination which comprises recording means adapted to record an indication on a record chart, means for applying said voltage to said recording means, and means for selectively controlling the recording of said voltage highly to emphasize the zero incidence portions of said voltage relative to portions thereof corresponding to substantial excursions away from zero.

7. In seismic recording of a plurality of alternating voltages representative of the motion of the earth at seismic detecting stations following detonation of an explosive charge, the combination which comprises a multielement recording means adapted separately to record a plurality of indications on a record chart, means for applying said voltages separately to the elements of said recording means, and means for selectively controlling the recording of said voltages by said elements highly to emphasize the zero incidence portions of said voltages relative to portions thereof corresponding to substantial excursions away from zero.

8. In seismic recording of a plurality of alternating voltages representative of the motion of the earth at seismic detecting stations following detonation of an explosive charge, the combination which comprises a multielement recording means adapted separately to record a plurality of indications on a record chart, means for applying said voltages separately to the elements of said recording means, and means for selectively controlling the recording of said voltages by said elements as to substantially limit the recording of said voltages to the time segments when said voltages are at zero and are passing through zero.

9. In seismic recording of a plurality of alternating voltages representative of the motion of the earth at seismic detecting stations following the detonation of an explosive charge the combination which comprises multielement recording means adapted separately to record a plurality of indications on a record chart, means for applying said voltages separately to the elements of said recording means, and means for selectively controlling the recording of said voltages by said elements as to disproportionately emphasize the zero incidence portions of said voltages relative to other portions thereof.

10. In seismic recording of a plurality of alternating voltages representative of the motion of the earth at seismic detecting stations following the detonation of an explosive charge the combination which comprises a plurality of galvanometers adapted separately to apply a plurality of indications to a photosensitive chart, means for applying said voltages separately to said galvanometers, and means restricting the paths of light from said galvanometers as to expose said paper only during and adjacent zero incidences of said voltages.

11. The system set forth in claim 10 in which said galvanometers initially are focused at a common point on said paper.

12. The combination set forth in claim 10 in which said galvanometers are initially focused on points uniformly spaced along a line across said paper and wherein means are provided to drive said paper in a direction perpendicular as to said line.

13. In seismic exploration wherein voltages are produced at detecting stations on the surface of the earth representative of earth motion at each of said stations, a system which comprises recording means including a chart driven at substantially constant speed past a recording point, multielement means for applying to said chart a plurality of indications at said recording point, means for applying said voltages separately to the multiple elements of said recorder to produce a plurality of vibratory indications of said chart, the vibrations occurring in a direction normal to the direction of movement of said chart, and means for sensing the density of zero incidences of said vibrations as a function of the length of said chart.

14. In seismic exploration where a plurality of voltages are produced at seismic detecting stations representative of variations of earth motion at each of said stations, the combination which comprises amplifying channels for each of said electrical voltages, a multielement recording means adapted to record on a record chart at a common recording point a plurality of indications, means for applying said voltages separately to the elements of said recording means for producing variations normal to the direction of movement of said chart, and baffle means for limiting the recording of said indications to the zero deflection portion of said chart.

15. In seismic exploration where a plurality of voltages representative of variations in earth motion at each of a plurality of seismic detecting stations the combination which comprises signal channels for each of said electrical voltages, a multielement recording means adapted to record on a record chart a plurality of indications, means for applying said voltages separately to the elements of said recording means for producing recordable voltages normal in sense to the direction of movement of said chart, and means for limiting the portions of said indications recorded on said chart to limited segments thereof at a selected mean point.

16. A method of obtaining geophysical data comprising the steps of creating seismic waves, detecting and converting said seismic waves into electrical signals, producing secondary signals comprising energy only at the quiescent points on said electrical signals, and recording said secondary signals.

References Cited in the file of this patent

UNITED STATES PATENTS

| | | |
|---|---|---|
| 2,403,997 | Potter | July 16, 1946 |
| 2,473,469 | Dahm | June 14, 1949 |
| 2,582,793 | Perry | Jan. 15, 1952 |
| 2,599,064 | Minton | June 3, 1952 |
| 2,615,778 | Butz | Oct. 28, 1952 |
| 2,638,402 | Lee | May 12, 1953 |
| 2,767,388 | Rust | Oct. 16, 1956 |
| 2,769,683 | Skelton | Nov. 6, 1956 |
| 2,791,288 | Meier | May 7, 1957 |
| 2,875,017 | Reynolds | Feb. 24, 1959 |

FOREIGN PATENTS

| | | |
|---|---|---|
| 384,692 | Great Britain | Dec. 15, 1932 |